May 23, 1944.　　　　J. P. LANNEN　　　　2,349,288
BALANCE TESTING MACHINE
Filed Sept. 9, 1940　　　　4 Sheets-Sheet 1

Inventor
Joseph P. Lannen
Attorney

Inventor
Joseph P. Lannen

May 23, 1944.   J. P. LANNEN   2,349,288
BALANCE TESTING MACHINE
Filed Sept. 9, 1940   4 Sheets-Sheet 3

Inventor
Joseph P. Lannen
By J. S. Murray
Attorney

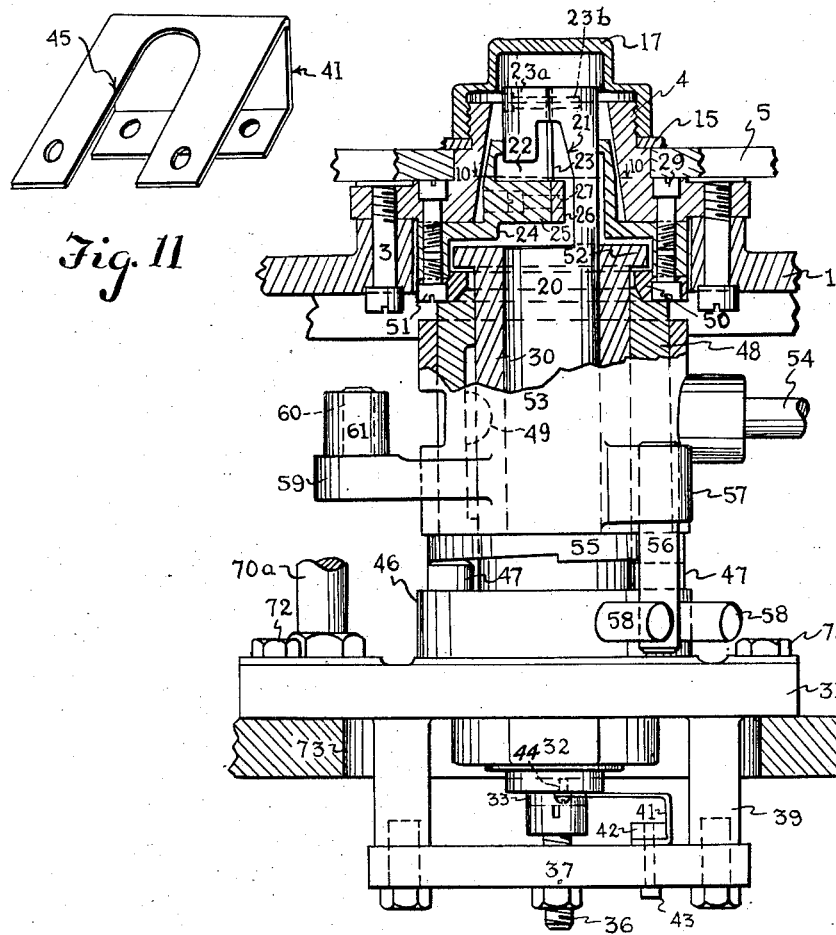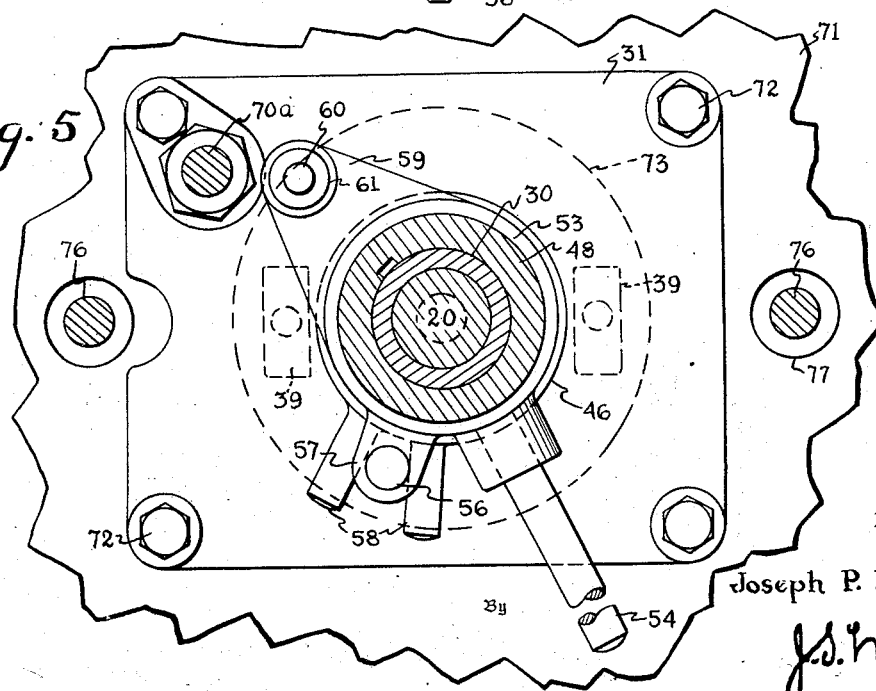

Patented May 23, 1944

2,349,288

UNITED STATES PATENT OFFICE 2,349,288

BALANCE TESTING MACHINE

Joseph P. Lannen, Detroit, Mich.

Application September 9, 1940, Serial No. 355,941

23 Claims. (Cl. 73—53)

This invention relates to balance testing machines and particularly to machines for static testing of tires or other annular pieces of work for balance.

Machines for the purpose above specified have heretofore largely employed a ball member or the like to universally pivot a work carrier plate, and the small bearing surface afforded by such a pivot element has entailed undue wear, with resultant development of inaccuracies and necessity for replacements.

An object of the invention is to support the carrier plate upon an improved universal pivot mounting that will not be subject to material wear and will largely avoid such deterioration as characterizes prior pivot devices serving a like purpose.

Another object is to provide a universally pivoted carrier plate with means for clamping and properly centering work thereon, to further provide a mechanism for relieving the pivot means of load when the machine is idle or when a load is being applied to or removed from the plate, and to provide for actuating the work clamp and pivot-relieving mechanism in common and in a desired sequence.

A further object is to exercise a common control as above specified and to assure a complete disengagement, during work testing, of control elements on the carrier plate and those mounted independently of said plate, so that the control mechanism may not interfere with a free tilting of the plate responsive to the load.

A further object is to provide for automatically relieving the pivot means of a load applied to the carrier plate, in event such load exceeds intended capacity of the machine.

A further object is to adapt the carrier plate of a balance testing machine to be suspended for universal tilting movement by a wire or the like and to safeguard such suspension from torsional stresses.

Further objects are to provide in an improved manner for damping oscillations of the carrier plate, so that it may assume its indicating position in a minimum time, and to provide an improved adjustment means for correcting any initial or acquired lack of balance in the carrier plate and parts tilting therewith.

These and various other objects the invention attains by the construction hereinafter described and illustrated in the accompanying drawings, wherein:

Fig. 5 is a horizontal section taken on the line 5—5 of Fig. 3, showing certain control features of the machine.

Fig. 8 is an axial vertical sectional view of the supporting and pivotal suspension means for the carrier plate.

Fig. 11 is a perspective view of a spring device employed in the machine.

Figures 1, 2:
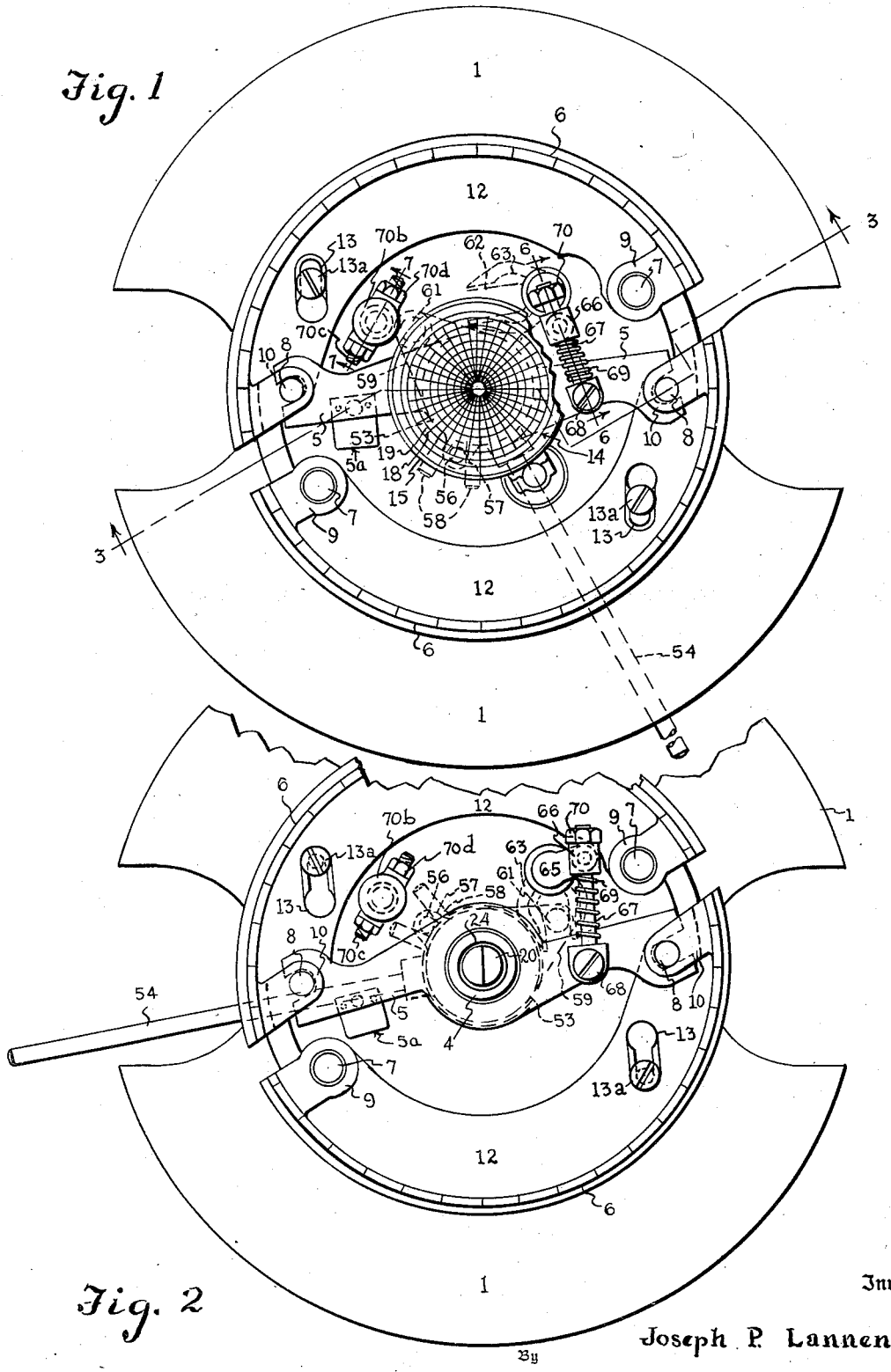
Fig. 1 is a top plan view of the testing machine, the paired work-clamping shoes being shown held apart in work-engaging position.
Fig. 2 is a similar view, showing the work-releasing position of said shoes.

In the following detailed description, the parts are designated by suitable reference characters, also applied in the various figures of the drawings.

Work mounting and clamping provision

The reference character 1 designates a circular carrier plate for work requiring testing for balance, such work, as illustrated, being an ordinary pneumatic tire 2. The plate 1 is formed with a central aperture to the margin of which is secured by bolts 3 an upstanding hub 4 annularly exteriorly shouldered to seat a lever 5 centrally pivoted on said hub. Said lever serves to actuate a pair of complementary substantially semi-circular shoes 6 for clamping and centering work on the plate 1. Said shoes are pivoted at relatively reverse ends thereof on pins 7 rigidly upstanding from the plate 1 and the other or free ends of the shoes rigidly carry pins 8 against which the lever terminally takes effect. Preferably the shoes are integrally formed with inwardly projecting lugs 9 at their pivotal ends for engagement by the pins 7 and with inwardly projecting lugs 10 at their free ends mounting the pins 8. The lugs 10 are horizontally slotted as indicated at 11 to accommodate the lever ends, and said ends are slotted back from the terminal edges of the lever to accommodate the pins 8. Thus swinging of the lever in one direction serves to expand the shoes and they are retracted by reversely actuating the lever. Reinforcing the shoes and inwardly projecting from their lower edges are wide flanges 12 terminating at the lugs 9 and 10. Said flanges are similarly slotted at 13 to accommodate headed pins 13a carried by the plate 1 to hold the shoes down and prevent imposing bending strains on the pivot pins. Fig. 1 shows the shoes in work-clamping position and their retracted position is shown in Fig. 2. The purpose of a weight 5a carried by one end portion of the lever is hereinafter explained.

Universal level

As will presently be described, the plate 1 and attached parts are centrally pivoted to tilt in any direction according to location of the center of gravity of any piece of work applied to said plate, and to provide for accurate indication of direction and extent of such tilting, a bubble-type universal level 14 is carried by said plate. It is preferred to mount said level at the central axis of said plate and to space it some distance above the plate. This is accomplished by mounting a dished circular holder 16 on the hub 4, on a suitable annular shoulder thereof, and seating the level on the rim of such holder, coaxially with the latter. The holder is clamped on the hub by a cap nut 17, serving also to exclude dust and dirt from the pivot means. The glass top of the level carries radial markings 18 to indicate the radial direction of bubble travel, and circular markings 19 to measure extent of such travel. (Fig. 1.)

Universal pivotal mounting of carrier plate

When the plate 1 is horizontal, its central axis is, of course, vertical. At such vertical axis is disposed a pin 20 having its upper portion projecting into the hub 4 through the central aperture of said plate to pivotally mount the latter. Thus said upper portion is vertically slotted, as indicated at 21 and is formed with an opening 22 extending from the lower portion of the slot 21 to a lateral face of said pin, and the carrier plate is pivotally suspended from a short length of hard wire 23 disposed in the slot 21 and secured above the latter to the pin 20. The wire is secured to the pin by forming a clamping portion 23a of the pin separately from the pin proper and engaging the upper portion of the wire in complementary grooves formed in the clamping portion and the opposing face of the pin proper. The clamping portion defines the top face of the opening 22 and is placed under clamping stress by screws 23b. For mounting the carrier plate on said wire, an inner hub 24 is rigidly attached to the hub 4 and is interiorly integrally formed with a semi-circular web 25 projecting into the slot 21 through the opening 22, to which web the lower end of the wire is clamped by a plate 26 held in place by screws 27.

The inner hub fits closely enough about the upper end of the pin 20 to prohibit material lateral movement of the carrier plate.

Downwardly extending from the inner hub 24 and housing the pin 20 is a hollow post 30 rigidly carried at its lower end upon a mounting plate 31 centrally apertured to receive the lower end of the post, and the latter having an exterior annular shoulder seating on the plate. A nut 32 threaded on the projecting lower end of the post is clamped tightly against the bottom of the plate 31 to assure rigidity. The pin 20 projects downwardly slightly beyond the post 30 and a hollow plunger 33 fits slidably in the lower end portion of a bore extended centrally upwardly into the pin. A bolt 34, tapped into the pin at the upper end of said bore, extends downwardly through the bore and is headed within the plunger. A spring 35 coiled around such bolt is compressed between the upper end of said bore and the plunger, transmitting the weight of the pin and its load to the plunger and normally holding the head of the bolt upwardly seated against an interior annular shoulder of the plunger. The plunger seats on the head of an adjusting screw 36 tapped into the center of a horizontal plate 37 and engaged beneath such plate by a lock nut 38, securing it in adjustment. The plate 37 is supported by and downwardly spaced from the plate 31 by forming integrally with the latter a pair of depending lugs 39 to which the plate 37 is terminally clamped by bolts 40. The bolt 34 serves to preload the spring 35, thus permitting use of a sufficiently light spring to properly limit the load.

To restrain the pin 20 from material rotation and thus safeguard the wire 23 from torsional stresses, it is preferred to establish a suitable spring connection between the lower end of said pin and plate 37. This connection comprises a sheet metal member 41 (Fig. 11) clamped at one end to the plate 37 by means of a block 42 and screws 43, said member being upwardly bent and again bent to form an elongated upper portion terminally engaging beneath the pin 20 and secured to the latter by screws 44. Said elongated portion is slotted as indicated at 45 for substantially its full length to accommodate the plunger 33 and also to so weaken said portion that it will readily flex vertically, when desired.

It is essential to differentiate between the spring device 41 and common provisions such as splines for guiding a part in sliding travel while prohibiting its rotation. The device 41 very definitely prohibits rotation but flexes vertically so readily as to offer no material resistance to the slight required sliding of the pin 20. It requires no lubrication. Prior devices as for example, splines would have to fit closely to secure an equivalent positive action in prohibiting rotation, and they would hence interfere with free sliding.

Carrier plate locking means

Seated on the plate 31 and rotatively embracing the post 30, is a ring 46 having set thereinto at opposite sides of the post a pair of pins 47 headed above the ring to support a sleeve 48. Said sleeve is free to undergo a limited vertical sliding on the post but is restrained from rotation by a key 49 carried by the post. The bottom end face of said sleeve forms two spiral cams each extending through one hundred and eighty degrees, said faces respectively engaging the respective heads of the pins 47, whereby the sleeve may be predeterminedly raised or lowered by rotating said ring through a suitable angle less than one hundred and eighty degrees. The upper edge of said sleeve is chamfered outwardly and downwardly at an angle of preferably forty-five degrees, and in a raised position of the sleeve, is engagable with a similarly chamfered edge of a hardened metal ring 50 bolted as indicated at 51 to the inner hub 24. The inner portion of the ring 50 engages beneath an annular exterior flange 52 on the upper end of the post 30, so that the slight lifting of said ring which may be effected by the sleeve 48 suffices to clamp the ring against the flange 52. Since the ring 50, hubs 24 and 4, and carrier plate 1 are all rigidly interconnected, it follows that the carrier plate is locked against tilting movement, when the sleeve 48 is raised, and the wire 23 is then relieved of load. It is to be noted that said wire is sufficiently stiff that it may readily transmit the slight lifting movement effected by the sleeve to the pin 20. In its lowered position, the sleeve has a slight clearance from the ring 50 and the carrier plate with its load is solely and pivotally supported by the wire 23.

Control in common of the clamping shoes and locking means

Freely rotative on the sleeve 48 is the hub 53 of an elongated lever 54, projecting sufficiently beyond the carrier plate to be readily accessible. Said hub seats on an annular flange 55 exteriorly formed on the lower end of said sleeve. An actuating connection from the hub 53 to the ring 46 is established by a vertical pin 56 having its upper end rigidly set into a lug 57 on said hub and its lower end fitted freely between two slightly divergent pins 58 radially carried by said ring. Thus a rotary drive in either direction may be transmitted from the hub to the ring without interfering with the slight raising and lowering of the hub entailed by vertical sliding of the sleeve 48.

The hub 53 is further integrally formed with a substantially radial arm 59 the outer end of which carries an upstanding pin 60 on which a roller 61 is journaled. In approaching one limit of its angular travel, the hub 53 inserts the roller 61 in the slot 62 of a Geneva arm 63 fixed on the lower end of a vertical crank shaft 64 journaled in the carrier plate 1. Above such plate a crank arm 65, formed integrally with or otherwise rigidly carried by said shaft, terminally journals a vertical pin 66, headed to form a slide bearing for a toggle arm 67. One end of the latter is headed to pivot said arm on a pin 68 rigidly upstanding from the lever 5, and a spring 69 coiled on said arm is compressed between said headed end and the head of the pin 66. The other end of the arm 67 rigidly mounts a nut 70 limiting separative travel of the pins 66 and 68.

When the crank arm 65 and toggle arm 67 are axially in the same vertical plane, as disclosed by Fig. 1, the spring 69, under maximum stress, serves to hold the lever 5 in its shoe-expanding position. This position is established by a clockwise rocking of the Geneva arm to position shown by Fig. 1, and results from a counter-clockwise rocking of the hub 53. It is to be noted that the crank arm cannot travel clockwise materially beyond the position shown in Fig. 1, since the member 15 forms a stop encountered by the head of the pin 66. Counter-clockwise rocking of the hub 53 is continued after the roller 61 has cleared the Geneva arm until the limiting position of said roller shown in Fig. 1 is established by engagement of the headed studs 47 with shoulders formed by the cammed bottom face of the sleeve 48. After clearing the Geneva arm, continued actuation of the hub 53 serves to so complete lowering of the sleeve 48 as to unlock the carrier plate, leaving it pivotally free to test the piece of work clamped by the shoes 6.

Clockwise actuation of the hub 53 partially elevates the sleeves 48 toward its locking position before the roller 61 engages the Geneva arm, and as said arm is being actuated by the roller from the position of Fig. 1 to that of Fig. 2, the locking travel of said sleeve is completed. The counterclockwise travel of the Geneva arm "breaks" the toggle joint between the crank arm 65 and sliding arm 67, relieves stress on the spring 69 and establishes the shoe-releasing position of the lever 5 shown in Fig. 2.

Prevention of carrier plate rotation

It is necessary to avoid rotation of the carrier plate since this would impose an undesirable torsional strain on the wire 23, and further disturb the proper working relation of the roller 61 and Geneva arm 63. To effect such prevention, a rigid rod 70a, fixedly mounted on the plate 31, is upwardly extended from said plate to engage in a dome-shaped upward extension 70b of the plate 1. Oppositely threaded into said extension is a pair of stop pins 70c between which the upper end of the rod 70a is engaged, said pins being held by lock nuts 70d in an adjustment such as to afford the carrier plate free tilting while prohibiting material rotation of said plate. The axis of said pins is, of course, transverse to the radial plane established by the rod 70a so that said pins may exercise the desired function.

Damper mechanism and base of machine

Figure 3:
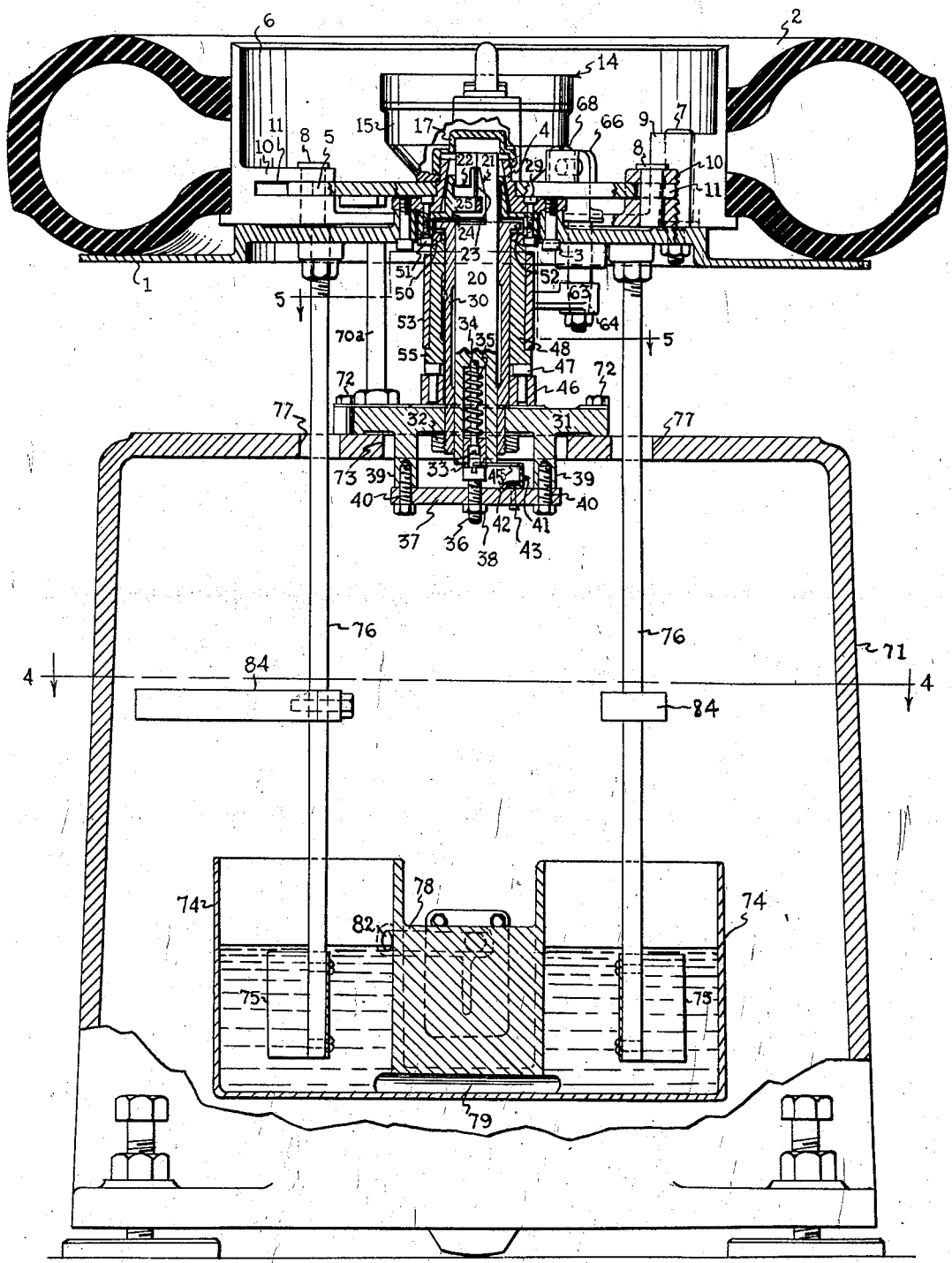
Fig. 3 is an axial sectional elevation of the machine, taken on the line 3—3 of Fig. 1.
Figure 4:
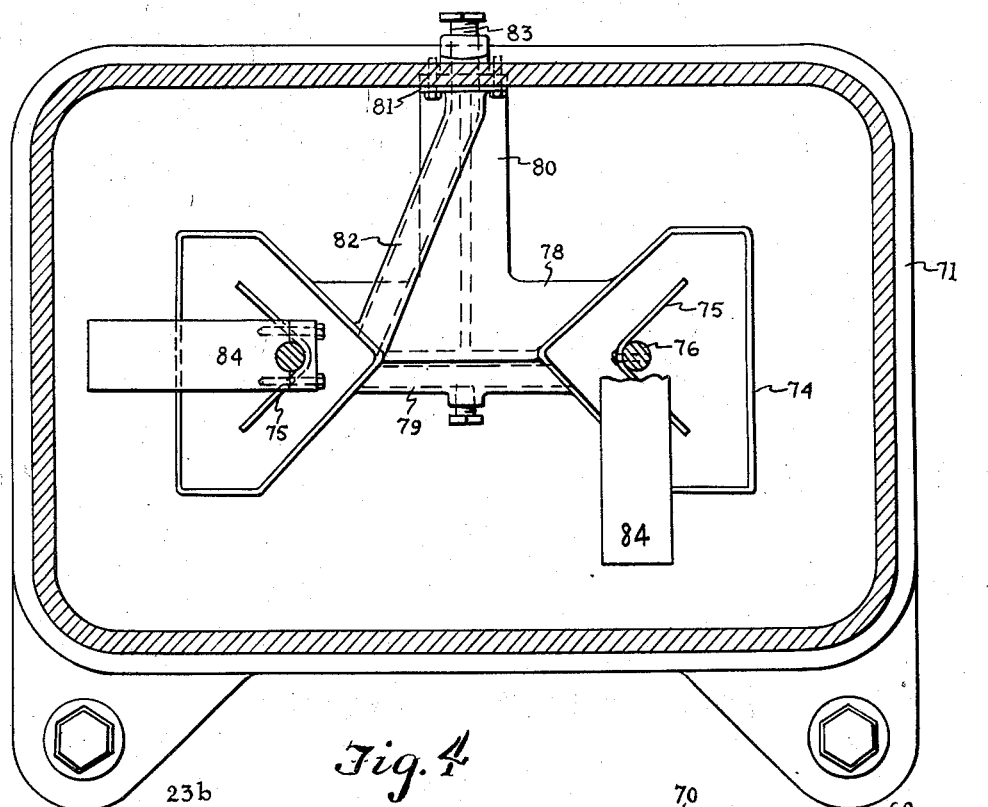
Fig. 4 is a horizontal section, taken on the line 4—4 of Fig. 3, particularly showing an oscillation damper within the base of the machine.
Figure 9:
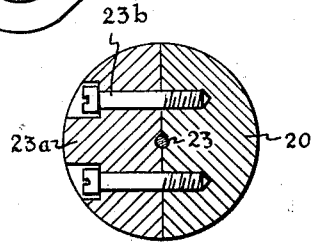
Fig. 9 is a detail cross section of the upper end portion of a pin, showing a provision for clamping thereto a suspension wire for the carrier plate.
Figure 6:
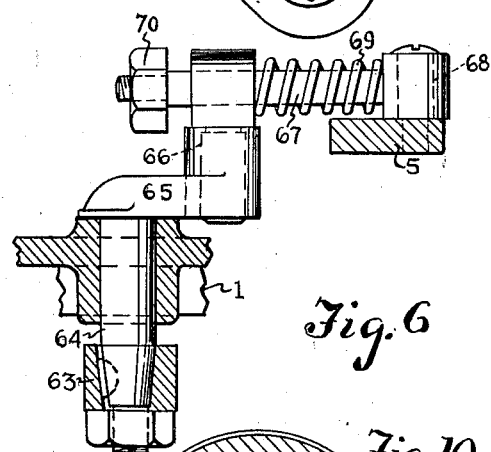
Fig. 6 is a fragmentary vertical section taken on the line 6—6 of Fig. 1, showing a crank shaft through which work-clamping shoes are actuated.
Figure 7:
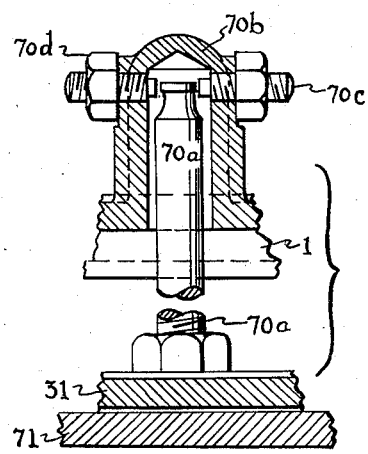
Fig. 7 is a fragmentary vertical section taken on the line 7—7 of Fig. 1, showing a provision for restraining the work carrier plate from rotation.
Figure 10:
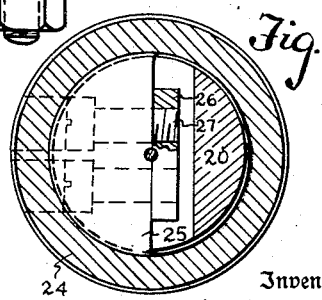
Fig. 10 is a cross sectional detail taken on the line 10—10 of Fig. 8, showing a provision for clamping the carrier plate to said wire.

It is preferred to superpose the mounting plate 31 on a hollow base 71 which houses mechanism for damping oscillations of the carrier plate and its load. Said mounting plate, which is bolted to the base as indicated at 72, forms a closure for a central opening 73 of the base, accommodating the lugs 39. The damper mechanism comprises an open-topped tank 74 in the lower portion of the base, receiving oil or some other liquid having a low rate of evaporation. Submerged in such liquid are a pair of V-shaped sheet-metal blades 75, vertically and rigidly carried by the lower ends of two parallel elongated rods 76 which extend upwardly through suitable oversize openings 77 in the top of the base and are rigidly connected, as by illustrated threaded connections (Fig. 3), to the carrier plate 1, equidistantly from its axis. To minimize the required amount of liquid, it is preferred to employ a twin type of tank providing separate vessels respectively receiving the respective blades 75. Said vessels are rigidly interconnected by a vertical metal web 78 and also by a duct 79 integral with the lower edge of said web. Centered between the two vessels and laterally extending from the web 78 is a supporting arm 80 terminating in a mounting plate 81 which is bolted to a wall of the base 71, and a duct 82 for supplying liquid to said vessels extends integrally with said arm from one of the vessels to the plate 81. Said duct has an inlet formed in a boss projecting through the wall engaged by the plate 81, said inlet being normally closed by a plug 83. The duct 82 determines the maximum liquid level within the twin tank and permits of easily replenishing the liquid when necessary. Full submergence of the blades 75 secures a maximum damping effect. By lowering the liquid level, such effect may be diminished to a desired extent.

Within the base 71 and at a suitable point above the tank 74, elongated weights 84 are clamped at ends thereof on the rods 76 in an approximately transverse relation to each other, and are adjustable both rotatively and vertically on such rods. The purpose of such weights is to facilitate correction of any lack of balance of the unit formed by the carrier plate and the parts connected thereto. The transverse relation of such weights assures that they can jointly serve to shift the center of gravity of the carrier plate in any direction to correct unbalance. Such correction is usually necessary upon initial assembly and occasionally necessity for further correction arises during use of the machine. It is evident that said weights afford correction through an extensive range, since the center of gravity of the universally pivoted unit will be variously shifted by any vertical or rotative adjustment of the weight, or by combining such adjustments.

*Operation of the machine*

In using the described machine, a tire or other piece of work to be tested for balance is applied to the carrier plate 1, while the shoes 6 are retracted, and while the sleeve 48 is in raised position, locking the plate against pivotal movement and protecting the pivot means from stresses. The sequence of movements obtained by rendering both the clamping shoes and the sleeve 48 responsive to the lever 54 assures that the shoes will be retracted when the locking sleeve is raised. As soon as the work is in place the operator swings the lever 54 from its position shown in Fig. 2 to that of Fig. 1. During initial portion of such lever actuation, the shoes are expanded due to straightening of the toggle formed by the crank arm 65 and toggle arm 67. During final part of the lever actuation the sleeve 48 is permitted to assume its lowered position, unlocking the carrier plate and allowing latter to apply its load to the wire 23. The operator now ascertains direction and amount of unbalance of the tire 2 or other piece of work by noting direction and extent of travel of the level bubble. The lever 54 is then thrown back to its position as per Fig. 2, releasing the tire and again locking the carrier plate from pivotal movement. It is important to note that the roller 61 and the Geneva arm 63 are necessarily fully disengaged when the machine is in condition for a testing operation, since said arm is required to participate in tilting travel of the carrier plate, whereas the roller is incapable of such participation.

Rendering both the shoes and locking means responsive to a single control element, namely the lever 54, permits testing operations to be performed with considerably more rapidity than has been heretofore achieved, and further provides an automatic safeguard for the pivot means of the machine, since the work can neither be applied to nor removed from the carrier plate until the operation of locking said plate and thus relieving the pivot means has been performed.

Employment of the wire 23 to mount the carrier plate for universal movement eliminates unduly rapid wear characterizing ball pivots, and avoids inaccuracy due to such wear also eliminating labor and material expense in effecting pivot replacements, and loss of use of the machine in the course of such replacements.

The spring 35 is of a predetermined stiffness such as to establish a maximum safe loading capacity for the machine. The pin 20 is supported upon said spring and thus normally maintained at an elevation such that the carrier plate is suspended by the wire 23 when the sleeve 48 is lowered. If the carrier plate is excessively loaded, however, the spring 35 will yield under the stress transmitted through said wire, permitting the pin 20 to slide downward the slight distance necessary to seat the carrier plate on the lowered sleeve 48. Thus until excess load is removed, the machine will remain inoperative. The plunger 33 serves simply as a lower abutment for the spring 35, transmitting load from the latter to the head of screw 36.

Since machines of the described character are accurate in their indications only within certain load limits, and excessive loads may be damaging to the universal pivot means, the described automatic provision for preventing operation of the machine if excessively loaded is highly desirable.

Provision of the weight 5a on the lever 5, serves to avoid such disturbance of the accurately balanced condition of the carrier plate as might otherwise result from swinging of the lever. Thus the parts 67, 68, 69 and 70 attached to and moving with one end portion of the lever would disturb balance were it not for the weight 5a carried by the opposite end portion of the lever and moved counter to the motion of the specified parts.

The twin type of oscillation damper disclosed as a feature of this machine is particularly desirable in quickly overcoming any tendency of the carrier plate to undergo small magnitude rotatory vibrations. Such vibrations would necessarily be slight owing to restrain imposed by the rod 70a, but in absence of proper damping they might disturb the bubble of the level for a considerable time period.

The invention is presented as including all such modifications and changes as come within the scope of the following claims.

What I claim is:

1. In a balance testing machine, a work carrier formed with a central opening, a normally fixed support for the carrier upwardly projecting into said opening, an elongated element having an upper portion secured to said support for universally pivoting the carrier, and means within said opening for clamping the carrier to said element, said element having a freely flexible length of substantially circular cross section extending in spaced relation to said support between said secured upper portion and said clamping means.

2. In a balance testing machine, a work carrier formed with a central opening, a normally fixed support for the carrier upwardly projecting into said opening and itself formed with an opening, an elongated element disposed fully within the opening of the support and substantially at the vertical axis of the support, the upper portion of said element being secured to said support, and means within said opening of the carrier for clamping the carrier to said element, said element having a freely flexible length of substantially circular cross section extending in spaced relation to said support between said secured upper portion and said clamping means, whereby the carrier is universally pivoted.

3. A balance testing machine as set forth in claim 2, said clamping means comprising an arm on the carrier within its central opening projecting into said opening of the support for connection to said element.

4. In a balance testing machine as set forth in claim 1, a hub centrally upwardly projecting from the carrier and freely fitting around said support to resist excessive lateral movement of the carrier.

5. In a balance testing machine, a work carrier, vertically elongated, laterally flexible means for universally pivoting said carrier, a support for said pivot means, a spring mounting said support and affording it a limited downward movement under overload, and means for seating the carrier responsive to downward movement entailed by yielding of said spring.

6. In a balance testing machine as set forth in claim 5, a post within which said support is slidable, the major portion of said spring being disposed within said support.

7. In a balance testing machine, a work carrier, means for universally pivoting the carrier, a vertically elongated support for said pivot means, said support having an opening extended upwardly from its lower end, a spring mounting the support and affording it a limited downward movement under overload, the major portion of said spring being disposed within said opening, and means for seating the carrier responsive to yielding of said spring.

8. In a balance testing machine, a work carrier, means for universally pivoting said carrier, a support for said pivot means, a spring mounting said support and affording it a limited downward movement under overload, means for seating the carrier responsive to yielding of the spring, and a seat for the spring vertically adjustable to regulate normal clearance of the carrier from its seating means.

9. In a balance testing machine, a carrier plate for work, mechanism carried by said plate for clamping work thereon, including a crank shaft, a Geneva arm fixed on the crank shaft beneath the carrier plate, means pivoting the carrier plate for a universal tilting movement, a seating member for said plate movable upwardly to seat the plate and downwardly to transfer the carrier plate load to the pivot means, a member rotary beneath the carrier plate for actuating the seating member, and an element carried by said rotary member directly effective upon the Geneva arm to rock the crank shaft.

10. In a balance testing machine, a carrier plate for work, vertically elongated, laterally flexible means pivoting the plate for a universal tilting movement, a post fixed beneath the plate and a pair of screws carried by the carrier plate at opposite sides of the post and adjustable to and from the post to restrain the plate from rotation, without interference with tilting of the plate.

11. A balance testing machine as set forth in claim 10, the plate having a portion domed to receive the upper end of the post and said screws being mounted in the dome portion of the plate, and accessible above the plate.

12. In a balance testing machine, a work carrier, means pivoting the carrier for a universal tilting movement, a rod rigidly carried by and depending from the carrier, a damper element carried by the lower portion of said rod and effective to damp oscillations of the carrier in all directions of its movement, a tank receiving a liquid submerging said element, and a weight eccentrically mounted on said rod and adjustable vertically and rotatively on the rod to establish proper balance of the unloaded carrier.

13. In a balance testing machine, a work carrier, means pivoting said carrier for universal movement, a vessel beneath said carrier, a liquid in said vessel, a pair of rods rigidly depending from said carrier and substantially equidistant from the vertical axis determined by its universal pivot, and damper elements carried by the lower portions of said rods and at least partially submerged in said liquid, said elements being jointly effective to damp oscillations of the carrier in all directions of its movement and to resist rotative oscillations about an axis downwardly extending from its universal pivot.

14. In a balance testing machine, a carrier plate, a pair of work clamping shoes pivoted upon said plate, means pivoting said plate for a universal tilting travel, a lever pivoted upon and substantially at the axis of said plate, connections from the respective lever ends to the respective shoes, for expanding and retracting the shoes by means of the lever, and a mechanism including a lever effecting shoe-expanding and shoe retracting travel of the first-mentioned lever.

15. In a balance testing machine, a work carrier, a universal pivot member attached to the carrier at the vertical axis of the carrier and elongated upwardly from the carrier and freely flexible laterally in all directions, a support engaged by the pivot member in upwardly spaced relation to the carrier, a member beneath the carrier for seating the same during loading of the carrier, and unitary mechanism beneath the carrier for relatively adjusting said support and seating member vertically to seat or unseat the carrier.

16. In a balance testing machine, a work carrier, a universal pivot member attached to the carrier at the vertical axis of the carrier and elongated upwardly from the carrier and freely flexible laterally in all directions, a support engaged by the pivot member in upwardly spaced relation to the carrier and downwardly extended beyond the pivot member substantially along said axis, and a mounting engaged by the lower portion of said support.

17. In a balance testing machine, a work carrier, means for universally pivoting said carrier, a support for said pivot means, a spring mounting said support and affording it a limited downward movement under overload, means for regulably preloading said spring, and means for seating the carrier responsive to yielding of said spring.

18. In a balance testing machine, a work carrier, means pivoting said carrier for a universal tilting movement, mechanism for clamping work on the carrier in a centered relation to said pivot means, a seating member for said carrier movable upwardly to seat the carrier and downwardly to transfer the carrier load to the pivot means, a member rotative about the vertical axis established by said pivot means having a camming reaction with said seating member to raise or lower said member, a collar rotative about said axis and movable up and down in unison with the seating member, means for rotatively actuating said collar and camming member in unison affording the collar an up and down travel relative to the camming member, and coacting means on said collar and on the carrier plate for actuating said clamping mechanism.

19. In a balance testing machine, a work carrier, means pivoting said carrier substantially at its center for a universal tilting movement, a pair of work clamping shoes pivoted on the carrier, a lever pivoted on the carrier substantially at its center for actuating said shoes, an approximately vertical shaft journaled in the carrier and having a crank arm above the carrier, and an actuating connection from said crank arm to the lever including a spring compressively stressed in establishing the clamping position of the shoes, and means for rotating said shaft.

20. In a balance testing machine, a work carrier having a work centering provision, a support for said carrier disposed in its entirety below the level of the top of said centering provision, a universal pivot member for said carrier elongated substantially vertically, means attaching an upper portion of said pivot member to said support, and means mounting the carrier upon a lower portion of said pivot member, the pivot member having a portion freely extending between said attaching and mounting means, freely flexible laterally in all directions.

21. In a balance testing machine, a work carrier, vertically elongated, laterally flexible means pivoting the carrier for universal tilting movement, a post fixed beneath and upwardly projecting toward the carrier, the carrier having a socket receiving the upper end portion of the post, and means upon the carrier for regulating rotative play of the carrier with respect to said post.

22. In a balance testing machine, a work carrier, a support, means universally pivoting the carrier on the support, a seating member having a limited up and down sliding travel and relieving the support of the load of the carrier in the uppermost position of such travel, and a spring mounting said support and proportioned to yield under a predetermined overload on the carrier to allow the carrier to engage said seating member in the lowermost position of such member.

23. In a balance testing machine, a work carrier, a wire suspending and balancing the carrier flexible to serve as a universal pivot for the carrier, a support for said wire elongated along the downwardly extended axis of wire, means rigidly securing the ends of the wire respectively to the upper end portion of said support and to the carrier, a seating member beneath the carrier, mechanism for relatively shifting said support and seating member vertically to engage the carrier with and disengage it from the seating member, and means for resisting rotation of the carrier about the wire as an axis.

JOSEPH P. LANNEN.